Figure 1:
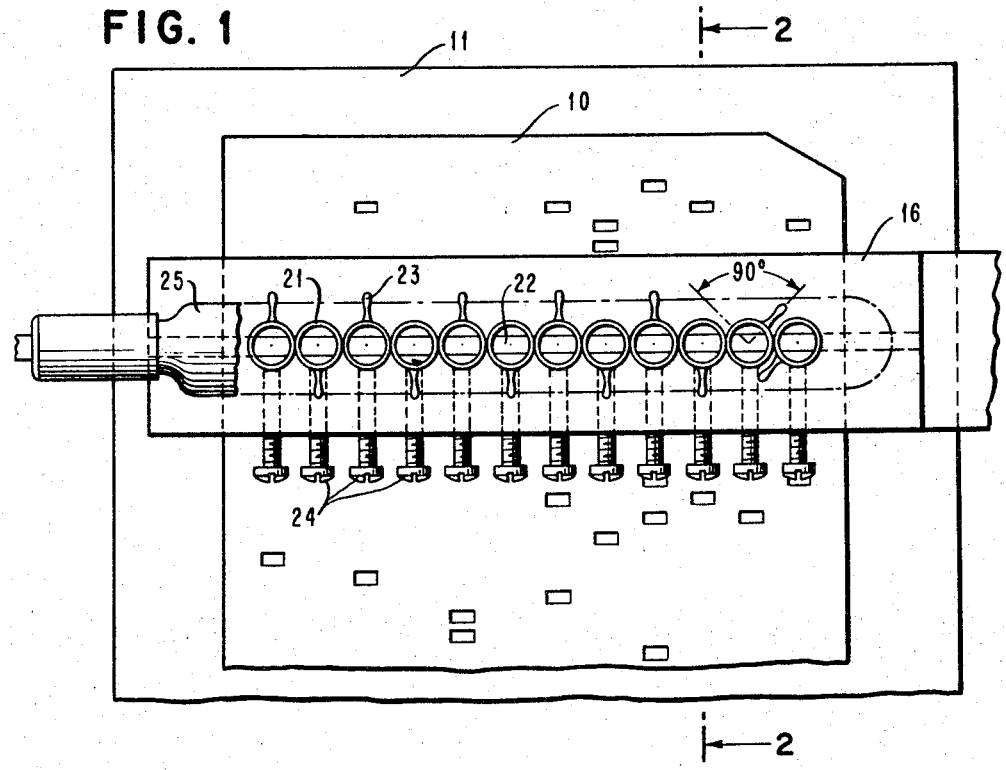

Dec. 11, 1962  A. C. RUOCCHIO ETAL  3,068,362
POLARIZED LIGHT CONTROL
Filed June 8, 1961

INVENTORS
ALBERT C. RUOCCHIO
DAVID H. SCHROEDER

BY
ATTORNEY

United States Patent Office 3,068,362
Patented Dec. 11, 1962

3,068,362
POLARIZED LIGHT CONTROL
Albert C. Ruocchio, Whitestone, N.Y., and David H. Schroeder, Horicon, Wis., assignors to International Business Machines Corporation, New York, N.Y., a corporation of New York
Filed June 8, 1961, Ser. No. 115,676
2 Claims. (Cl. 250—225)

This application relates to radiant energy sensing devices and more particularly to the controlling of the intensity of the radiant energy therein. There are many forms of radiant energy such as infra-red light, electro luminesence and others. Each has its own form of detector. However, when a plurality of detectors are to be controlled from one source of energy, it is difficult to control the intensity of the energy reaching the detector.

In photoelectric circuits, particularly those used for sensing statistical record cards, wherein a number of photoelectric elements are closely spaced, the even distribution of light from one or more light sources presents a problem. If a single source is provided, the light may vary in different parts of the lamp. If a plurality of lamps are used, each one will vary in intensity.

Heretofore a sensing system using a plurality of photocells and a single light source used Lucite rods to conduct the light from the lamp to the cells. This did not take care of the intensity of the light reaching each cell.

Some crystals such as tourmaline possess the property of absorbing light vibrations that are perpendicular to the axis of the crystal and of permitting the passage of light, the vibrations of which are parallel to this axis. If two thin plates or films of such crystal are placed in a beam of light, the intensity can be varied by rotating one with respect to the other. The first plate or film acts to polarize the light, i.e., pass all vibrations parallel to the axis of the crystal and is known as the polarizer. If the beam, after having passed through the polarizer is now allowed to fall on the second plate, known as the analyzer, set so its axis is at right angles to the axis of the first crystal, no light will be transmitted. But, if the second plate is rotated through 90 degrees, thus making the axes of the two crystals parallel, full intensity of the light through the first plate will be transmitted. Any intermediate position of the second plate will vary the intensity accordingly. A well known firm manufactures a polarizing medium comprising a transparent material in which tiny crystals having their axes parallel to one another are imbedded.

Therefore, it is the principal object of this invention to provide a control that will defuse the light intensity of a system in which a single lamp is used to illuminate a plurality of light sensitive cells.

Another object is to provide adjustable screen for an individual photocell in a system comprising a plurality of cells for controlling the intensity of the light received by each cell from a single light source.

A further object is to provide a single system using polarizing screens for controlling the light intensity received by each of a plurality of cells from a single light source.

The foregoing and other objects, features and advantages of the invention will be apparent from the following more particular description of a preferred embodiment of the invention, as illustrated in the accompanying drawing.

Figure 2:
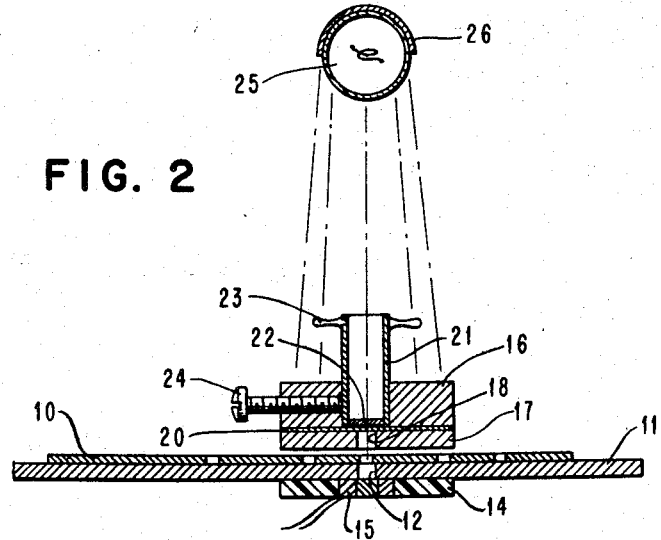

In the drawing:
FIG. 1 is a plan view of a statistical record card reading device incorporating the invention.
FIG. 2 is a cross section taken along line 2—2 of FIG. 1.

The invention is well adapted for use in a reader for statistical record cards. A card is fed between a row of light sensitive cells and a single light source. Light passing through a perforation in such a card will activate the light cell. Variations in cell characteristics and lamp intensity make it desirable that adjustments be made to insure an even and equal signal output. This is done by introducing an adjustable polarizing filter between the lamp and light cell.

In the drawing a card 10 is shown in reading position on a plate 11 having a row of apertures 12 corresponding to a column of index positions on the card. Secured to the bottom of plate 11 is plate 14 of dielectric material in which are positioned twelve light sensitive cells 15 corresponding to the index positions of a column of a card.

A frame member 16 extends over the card. Secured to the bottom of the frame by any well known means is a plate 17 having an aperture 18 aligned with each aperture 12 in plate 11. Positioned between the plates 16 and 17 is a sheet 20 of polarizing material which provides a polarizer. Frame 16 is formed with circular apertures in axial alignment with the holes 12 and 18, in which are positioned the adjustable analyzer portion of the device. The analyzer comprises a tube 21 to the bottom of which is secured by adhesive or any well known means, a disk 22 of polarizing material. A handle 23 is provided by which the analyzer may be rotated in the plate 16. A set screw 24 provides a lock for maintaining the tube 21 in adjusted position. A single elongated library type lamp 25 in a reflector 26 provides the light source. This lamp is positioned in any well known manner or frame not shown to transmit light through tube 21, disk 22, holes 18 and 12 to activate light cell 15 when there is a perforation in the card 10.

With no card in the device, each tube 21 is rotated until the intensity of the light reaching all light cells 15 is equal. Screws 24 are then tightened and the reader is then ready to read the holes in a statistical card and give an even signal from each of the light sensitive cells when activated.

While the invention has been particularly shown and described with reference to a preferred embodiment thereof, it will be understood by those skilled in the art that various changes in form and details may be made therein without departing from the spirit and scope of the invention.

What is claimed is:
1. In a photocell system, a light source, a plurality of photocells, associated therewith, a filter comprising a polarizer and an analyzer, a plate having apertures in axial alignment with each of said cells, a polarizer common to all of said apertures, a second plate having apertures in axial alignment with the apertures in said first plate, a cylinder mounted for rotation in each of the apertures in said second plate, an analyzer secured in each cylinder and means for rotating a cylinder and analyzer with respect to said polarizer whereby the intensity of light from said light source may be balanced for each cell.

2. In a radiant energy system, a source of radiation, a plurality of radiant energy devices associated therewith, a filter comprising a polarizer and an analyzer, a plate having apertures in axial alignment with each of said devices, a polarizer common to all of said apertures, a second plate having apertures in axial alignment with the apertures in said first plate, a tube mounted for rotation in each of the apertures in said second plate, an analyzer secured in each tube and means for rotating a tube and analyzer with respect to its associated polarizer whereby the intensity of light from said source of radiation may be balanced for each device.

References Cited in the file of this patent

UNITED STATES PATENTS

| | | |
|---|---|---|
| 2,254,022 | Whitaker | Aug. 26, 1941 |
| 2,376,311 | Hood | May 15, 1945 |
| 2,588,368 | Edgerton | Mar. 11, 1952 |
| 2,872,589 | Sliter | Feb. 3, 1959 |
| 2,966,673 | Guernsey | Dec. 27, 1960 |